(12) United States Patent
Perez et al.

(10) Patent No.: US 6,249,219 B1
(45) Date of Patent: Jun. 19, 2001

(54) SEVERE BRAKING WARNING SYSTEM FOR VEHICLES

(76) Inventors: Luis A. Perez, 1925 Roseate La., Sanibel, FL (US) 33957; Brian S. Corzilius, 26803 Oak Knoll Ter., Cloverdale, CA (US) 95425

( * ) Notice: Subject to any disclaimer, the term of this patent is extended or adjusted under 35 U.S.C. 154(b) by 0 days.

(21) Appl. No.: 09/533,743

(22) Filed: Mar. 23, 2000

(51) Int. Cl.$^7$ ..................................................... B60Q 1/50
(52) U.S. Cl. ........................ 340/467; 340/479; 340/464; 340/438; 340/439
(58) Field of Search .................................. 340/467, 479, 340/464, 438, 439

(56) References Cited

U.S. PATENT DOCUMENTS

| | | | |
|---|---|---|---|
| 3,846,749 | * 11/1974 | Curry | 340/72 |
| 4,357,594 | * 11/1982 | Ehrlich et al. | 340/72 |
| 5,059,947 | 10/1991 | Chen | 340/467 |
| 5,111,181 | 5/1992 | Priesemuth | 340/467 |
| 5,148,147 | 9/1992 | Kobres | 340/464 |
| 5,220,307 | * 6/1993 | May et al. | 340/439 |
| 5,309,141 | 5/1994 | Mason et al. | 340/467 |
| 5,459,449 | * 10/1995 | Ravas, Jr. et al. | 340/438 |
| 5,736,926 | 4/1998 | Winholtz | 340/479 |
| 5,801,624 | 9/1998 | Tilly et al. | 340/479 |
| 5,821,851 | * 10/1998 | Blackmer | 340/467 |
| 5,828,138 | * 10/1998 | McIver et al. | 307/10.1 |
| 5,969,602 | 10/1999 | Marks | 340/467 |
| 6,020,814 | 2/2000 | Robert | 340/467 |

* cited by examiner

Primary Examiner—Daniel J. Wu
Assistant Examiner—Tai T. Nguyen
(74) Attorney, Agent, or Firm—Laura G. Barrow

(57) ABSTRACT

A severe braking warning system for a vehicle is described wherein the system is designed to measure a vehicle's rate of motion and, upon deceleration of the vehicle, affect the vehicle's brake light circuit by switching it on and off at a pulse rate proportional to the severity of deceleration. The system comprises an accelerometer, a microprocessor (either an integrated unit or the vehicle's existing unit), transistor, and a switch in communication with the vehicle's existing brake light circuit. The inventive brake light warning system provides a supplemental indication to other vehicles traveling behind of the rate of braking, thereby reducing the possibility of rear-end collisions.

7 Claims, 3 Drawing Sheets

SEVERE BRAKING WARNING SYSTEM FOR VEHICLES

BACKGROUND OF THE INVENTION

As the highways become more crowded, especially during rush hours, the potential for multi-car accidents increases. Most of this can be attributed to drivers in vehicles not being able to adequately assess how fast the vehicles in front of them are braking. Braking warning devices have been described in the art that provide this capability by a variety of different mechanisms. Many of these devices, however, do not provide the degree of resolution to aptly characterize the severity of braking, and in some cases, are susceptible to the vehicle's attitude (i.e. ascending or descending a hill).

SUMMARY OF THE INVENTION

The present invention is directed to a self-contained, severe braking warning system for vehicles that continuously measures a vehicle's rate of motion and, upon braking, affects the brake light circuit proportionately to the severity of deceleration. Specifically, in certain embodiments the invention comprises an accelerometer programmed to measure deceleration forces exerted on it by a moving vehicle. The accelerometer is programmed to transmit varying output signals correlating to the deceleration forces. The system further comprises a microprocessor electrically connected to the accelerometer. The microprocessor is programmed to monitor the varying output signals from the accelerometer, calculate g-forces at any given time based upon the varying output signals, and create an output signal having a frequency based upon the deceleration forces detected by the accelerometer. The system also comprises a switch, preferably a logic-actuated switch, that is electrically connected to the microprocessor and to the brake light circuit of the moving vehicle, the brake light circuit further connected to the vehicles brake light indicators. The switch is configured to receive the output signal created by the microprocessor and to subsequently turn the brake light circuit on and off at a programmed rate correlative to the deceleration forces, thereby causing the brake light indicators to blink on and off at the programmed rate. The switch is most preferably connected to the brake light circuit such that the switch will not impede the normal functioning of the vehicle's brake light indicators during normal braking, or in the event the inventive warning system fails to operate properly or at all.

The severe braking warning system of the present invention is an improvement over existing and prior art systems in that it is designed for integration within a vehicle's computer during manufacture. Alternatively, the present invention may easily be added to an existing vehicle post-manufacture. The present invention provides an improved degree of resolution that more accurately characterizes the severity of braking in a particular situation and is not susceptible to the vehicle's attitude (i.e. climbing or descending a hill). The present invention employs a micro electromechanical system (MEMS) accelerometer that, together with a microprocessor, continuously monitors the vehicles acceleration state, to provide deceleration gradients greater than $1/10$ of gravity. The present invention further interfaces with existing vehicle lighting and thus does not require any additional operational training by the driver.

DETAILED DESCRIPTION OF THE PREFERRED EMBODIMENT

Figure 1:
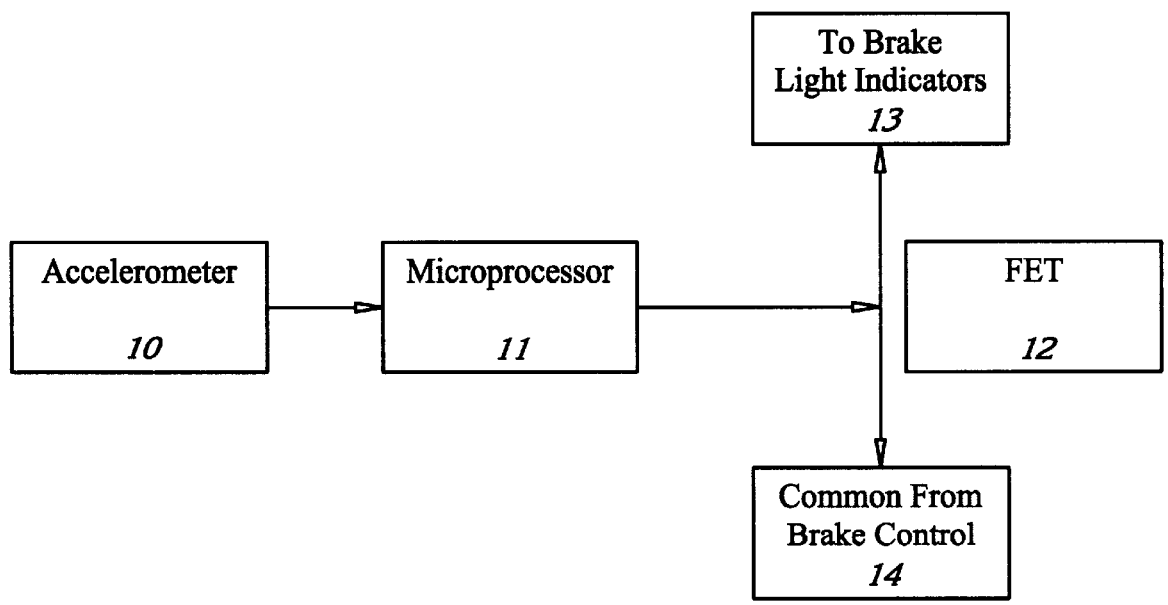
FIG. 1 is a schematic representation of the various components of the present invention.
Figure 2A:
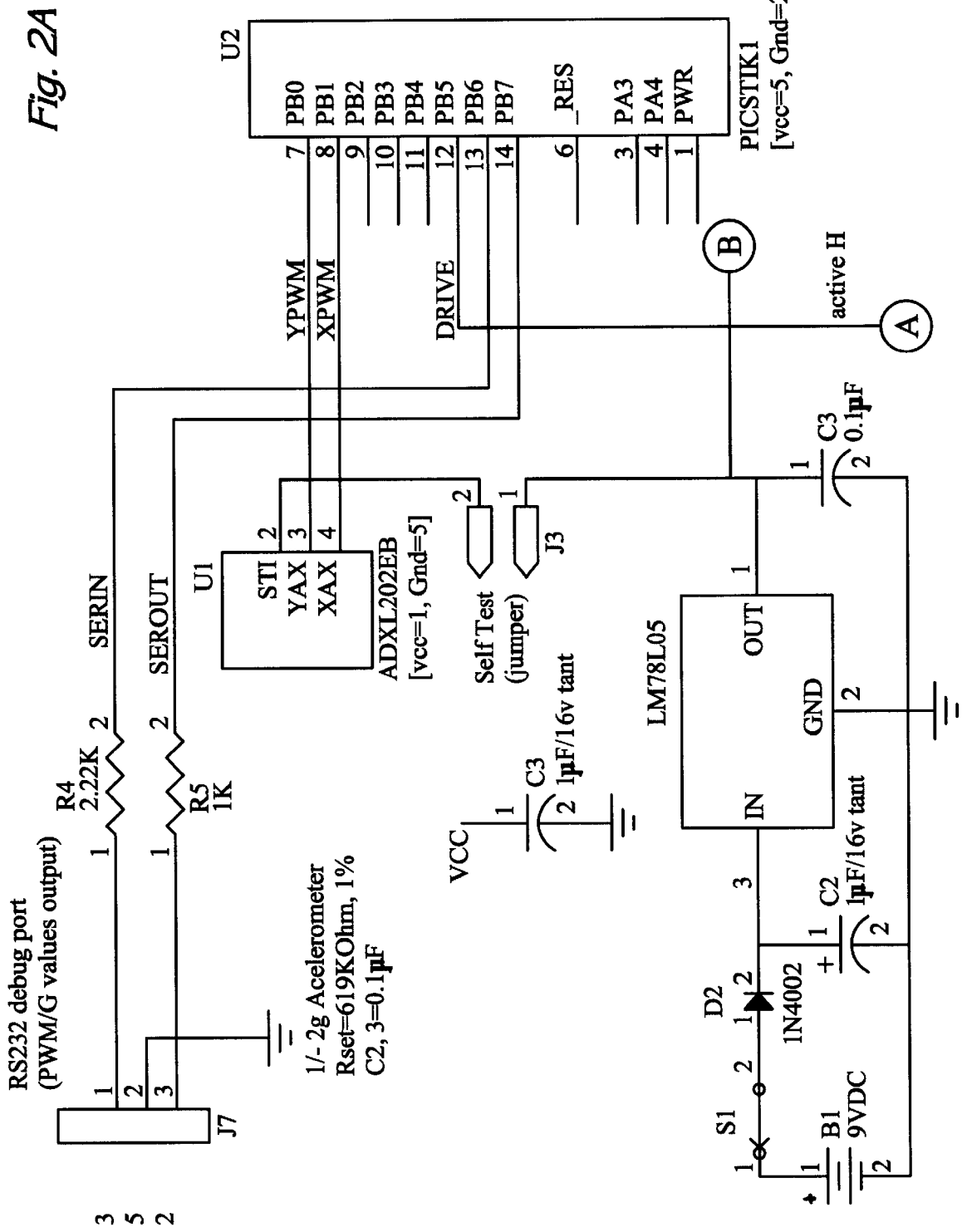
FIGS. 2A and 2B, in combination, illustrate an electrical schematic of the present invention.
Figure 2B:
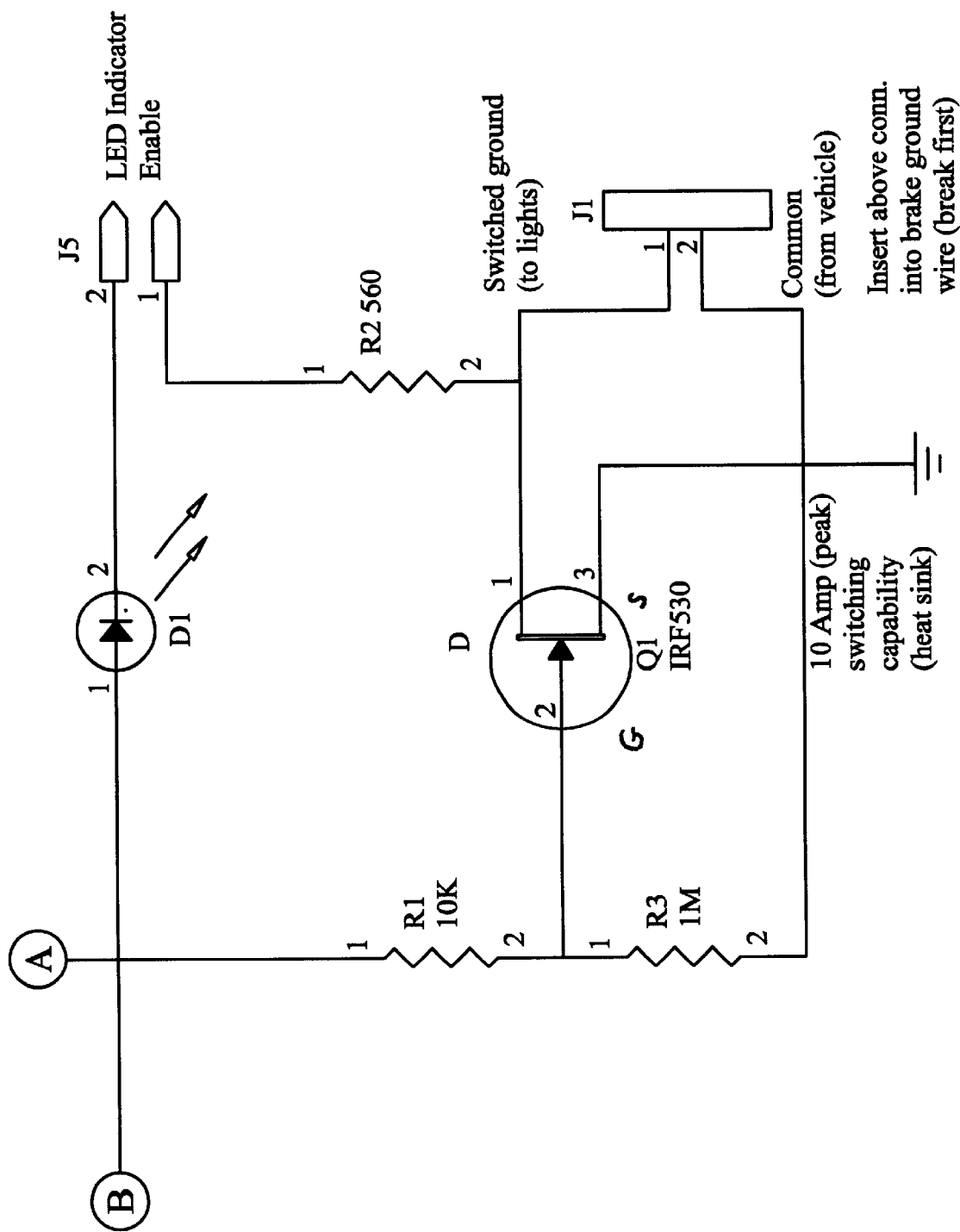

The present invention is directed to an improved severe braking warning system that integrates conveniently into a vehicle's existing computer system. Specifically, the invention comprises an accelerometer (10), preferably a MEMS accelerometer (i.e. an accelerometer comprising a micro-electrical mechanical systems semiconductor chip) that is programmed to transmit a varying output signal correlating to the deceleration forces exerted upon it by the moving vehicle. The warning system farther comprises a microprocessor (11) electrically connected to the accelerometer (10). The microprocessor may be the existing microprocessor of the vehicle's control unit or an independent device. The microprocessor is programmed with software code (see source code, written in BASIC language, found in Appendix A) for interpreting the accelerometer's output signal and for controlling the vehicle's brake lights. This program allows the microprocessor to monitor the varying output signals transmitted from the accelerometer, calculate g-forces at any given time based upon the varying output signals, and create an output signal having a frequency based upon the deceleration forces detected by the accelerometer. The software is thus designed to achieve the highest accuracy and the highest repeatability of such measurements.

The braking warning system further includes a logic-actuated switch (12), preferably an FET (field effect transistor) switch that is electrically connected to the microprocessor and to the existing brake light circuit of the vehicle. The switch is configured to receive the output signal created by the microprocessor to subsequently activate or turn the brake light circuit on and off at a programmed rate correlative to the deceleration forces. While an FET switch is the most efficient and economical type of switch for use in the present invention, it will be appreciated by those of ordinary skill in the art that other conventional transistors may be employed as well as relays. An important feature of the switch is that it is connected to the brake light circuit such that it will not impede the normal functioning of the vehicle's brake light indicators during normal braking by the driver or in the event that the inventive warning system fails to operate properly.

Based upon the known and calculated forces acting upon human-operated vehicles, an MEMS accelerometer having a sensitivity of +/−2g is employed. Together with the microprocessor, the accelerometer continuously monitors the vehicle's acceleration state to provide deceleration gradients greater than $1/10$ gravity. The FET is selected based upon the number of brake light indicators it must control on the vehicle and the sum of the expected electrical current drain from the brake light indicators. The microprocessor is programmed to measure the accelerometer's output signal to a degree of resolution of about 10 microseconds.

The present invention is powered by the vehicle's power source (i.e. battery). The power source can be: 1) 12 VDC from the vehicle (e.g. computer ops) and 2) 12 VDC from the brake control at application of brake pedal. When power is applied to the vehicle, and consequently the inventive braking warning system, the microprocessor's software program begins to execute the initialization process, first enabling the FET so that normal brake light indicators occur uninhibited. This feature of the invention is important in the event the warning system fails to operate properly, the vehicle's normal brake light indicators (13) will still function normally upon depression of the brake control (14). In the second step of the initialization process, the microprocessor determines the static state of the accelerometer as a reference point (i.e. the 0 g point) for future calculations of g-forces at any given time based upon the varying output signals generated by the system's accelerometer.

Following initialization, the inventive system continuously monitors the vehicle's rate of acceleration or deceleration. When the rate of acceleration or deceleration exceeds a pre-determined threshold, the microprocessor calculates the gravitational variation from the 0 g reference. [The pre-determined threshold is set within the microprocessor's source code based upon test trials performed on several vehicles.] The microprocessor then creates a square wave output signal having a frequency based upon the gravitational variation (i.e. deceleration) detected. This signal is then applied to the FET, which in turn switches the brake light circuit on and off to subsequently cause the brake light indicators (13) to blink on and off. During acceleration, wherein the brakes are not being depressed by the driver (and therefore no electrical current is flowing to the brake lights), no visual indication will be produced; however, during a true rapid braking period, the system will switch on and off the brake light indicator at a pulse rate indicative of the severity of deceleration (i.e. braking).

Most vehicles, especially non-commercial cars and trucks, have two to three rear brake light indicators (i.e. two light indicators in the tail light portion and in some vehicles a third light indicator in the upper center of the rear of the vehicle). The present invention may be designed, as discussed above, to operate with the existing brake light circuitry to switch on and off the vehicles existing brake lights indicators. Alternatively, the inventive braking warning system may be electrically connected directly to a third brake light that is only activated by the inventive warning system, preferably (in most cases) the brake light indicator positioned in the middle, upper rear portion of the vehicle between the two other existing vehicular brake lights.

We claim:

1. A brake light warning system comprising:
   a. an accelerometer programmed to measure deceleration forces exerted on it by a moving vehicle and to transmit varying output signals correlating to said deceleration forces;
   b. a microprocessor electrically connected to said accelerometer, said microprocessor programmed to monitor said varying output signals from said accelerometer and create an output signal having a frequency based upon the deceleration forces detected by said accelerometer;
   c. a switch electrically connected to said microprocessor and to an existing brake light circuitry of said moving vehicle, said brake light circuitry further connected to said vehicle's brake light indicators, wherein said switch is configured to receive said output signal created by said microprocessor to activate the brake light circuitry on and off simultaneously at a programmed rate correlative to said deceleration forces, thereby causing said brake light indicators to blink on and off at said programmed rate; and
   d. said switch further connected to said brake light circuitry such that said switch does not impede normal functioning of said vehicle's brake light indicators during normal braking.

2. The system of claim 1, wherein said switch is a logic-actuated switch.

3. The system of claim 2, wherein said switch is an FET switch.

4. The system of claim 1, wherein said accelerometer comprises a MEMS semiconductor chip.

5. The system of claim 1, wherein said microprocessor is an existing microprocessor of said vehicle.

6. The system of claim 5, wherein said switch is an FET switch.

7. The system of claim 6, wherein said accelerometer comprises a MEMS semiconductor chip.

* * * * *